US012661301B2

(12) United States Patent
Kitov

(10) Patent No.: US 12,661,301 B2
(45) Date of Patent: Jun. 23, 2026

(54) ELECTROACOUSTIC STIMULATION DEVICE AND METHOD

(71) Applicant: Zeev Vladimir Kitov, Rockville, MD (US)

(72) Inventor: Zeev Vladimir Kitov, Rockville, MD (US)

(*) Notice: Subject to any disclaimer, the term of this patent is extended or adjusted under 35 U.S.C. 154(b) by 0 days.

(21) Appl. No.: 18/090,165

(22) Filed: Dec. 28, 2022

(65) Prior Publication Data

US 2023/0218480 A1 Jul. 13, 2023

Related U.S. Application Data

(60) Provisional application No. 63/294,479, filed on Dec. 29, 2021.

(51) Int. Cl.
*A61H 39/00* (2006.01)
*A61H 23/02* (2006.01)

(52) U.S. Cl.
CPC ....... *A61H 39/002* (2013.01); *A61H 23/0236* (2013.01); *A61H 2201/5007* (2013.01)

(58) Field of Classification Search
CPC .. A61H 23/0236; A61H 23/008; A61H 23/02; A61H 23/0245; A61H 2023/0209; A61H 39/007
USPC .................................. 310/311, 322; 331/146
See application file for complete search history.

(56) References Cited

U.S. PATENT DOCUMENTS

| | | | | | |
|---|---|---|---|---|---|
| 2,283,285 | A | * | 5/1942 | Reimar | A61H 23/0245 310/317 |
| 3,072,805 | A | * | 1/1963 | Rich | H10N 30/802 310/314 |
| 4,232,241 | A | * | 11/1980 | Hamatani | B06B 1/0215 310/317 |
| 4,232,661 | A | * | 11/1980 | Christensen | A61H 23/0218 601/48 |
| 4,915,110 | A | | 4/1990 | Kitov | |
| 5,036,263 | A | * | 7/1991 | Yamada | H10N 30/802 318/116 |
| 5,050,587 | A | * | 9/1991 | Sagara | H02N 2/142 310/323.03 |

(Continued)

FOREIGN PATENT DOCUMENTS

| | | | |
|---|---|---|---|
| CN | 202554761 U | * | 11/2012 |
| CN | 206120697 U | * | 4/2017 |

*Primary Examiner* — Colin W Stuart
*Assistant Examiner* — Douglas Y Sul

(57) ABSTRACT

The device for electroacoustic stimulation and the method for using the same. The device is an electro-vibrational device operating in one of six acoustic frequency bands. It may be applied to muscles, tendons, and joints to achieve muscle relaxation and alleviation of pain. The device may also be used to induce psycho-physical effects, such as general relaxation of the body and psyche and inducing a state of spiritual calm, resembling results of meditation process. To maximize an effect, a vibratory stimulation is applied not only to the pain afflicted area, but also to symmetrical areas on the contralateral side of the body and similar zones according to the anterior-posterior symmetry. To enhance the electroacoustic stimulation effect, the vibrational signal is supplied either in a form of continuous wave, series of the same frequency trains, separated by pauses, or series of trains of different frequencies also separated by pauses.

15 Claims, 10 Drawing Sheets

(56) References Cited

U.S. PATENT DOCUMENTS

| | | | | |
|---|---|---|---|---|
| 5,169,380 | A | 12/1992 | Brennan | |
| 5,584,863 | A * | 12/1996 | Rauch | A61N 1/06 607/2 |
| 5,782,874 | A * | 7/1998 | Loos | A61N 1/36025 607/2 |
| 6,081,744 | A | 6/2000 | Loos | |
| 6,084,363 | A * | 7/2000 | Mizumoto | H02N 2/025 318/116 |
| 6,561,968 | B1 * | 5/2003 | Dissing | A61N 2/02 600/13 |
| 6,675,047 | B1 * | 1/2004 | Konoplev | A61N 2/02 607/155 |
| 2006/0015045 | A1 * | 1/2006 | Zets | A61H 23/0218 601/78 |
| 2007/0179414 | A1 * | 8/2007 | Imboden | A61H 19/00 601/72 |
| 2009/0005713 | A1 * | 1/2009 | Podrazhansky | A61H 23/0236 601/2 |
| 2012/0089081 | A1 * | 4/2012 | Chao Uei | A61H 23/0245 604/22 |
| 2013/0138023 | A1 * | 5/2013 | Lerro | A61H 1/005 601/46 |
| 2014/0276193 | A1 * | 9/2014 | Doochin | A61M 21/00 600/552 |
| 2014/0354111 | A1 * | 12/2014 | Jo | B06B 1/0215 310/317 |
| 2021/0022956 | A1 * | 1/2021 | Warlick | A61H 23/008 |

* cited by examiner

ELECTROACOUSTIC STIMULATION DEVICE AND METHOD

CROSS-REFERENCE TO RELATED APPLICATION

This application claims the benefit of U.S. Provisional Patent Application No. 63/294,479, filed Dec. 29, 2021. which is incorporated by reference herein in its entirety.

FIELD OF THE INVENTION

This invention relates to a device for electroacoustic stimulation and the method for using the same, and more particularly to an electro-vibrational device operating in the acoustic frequency band, that can be applied to muscles, tendons, and joints to achieve muscle relaxation and alleviation of pain. The device and the method may also be used to induce psycho-physical effects, such as general relaxation of the body and psyche and inducing a state of spiritual calm, resembling results of meditation process. Therefore, the device and method may be used to improve a mood of the subject.

BACKGROUND OF THE INVENTION

Vibrating massage devices are widely used in sport and physical therapy applications, where the athletes or subjects need to achieve muscle relaxation before or after a training session. Two widely used modalities available today for this goal are Ultrasound equipment, and Vibration massage devices.

An Ultrasound equipment produces heat in deep muscle tissues. This equipment is cumbersome and requires application of substantial power, more than 1 W/cm$^2$. It may also cause burns when used by inexperienced people, and thus requires professional supervision. Recently a low power Laser device was introduced. However, when used, this device affects only a small area and can hardly be used for relaxation of muscles, when a large group of muscles is involved. Besides that, it also requires professional supervision.

A vibration massager produces a low frequency periodical movement of muscle tissues, which increases blood flow. The best representative of such vibration massage devices is the Physioacoustic Chair designed for medical purposes with six imbedded subwoofer speakers used to apply low frequency sound vibration to the body from knees to shoulders at frequencies from 20 to 130 Hz. The FDA approved three claims for the treatment called physioacoustic therapy: (1) increased blood circulation, (2) decreased pain, and (3) increased mobility. However, this method still requires significant equipment, substantial power and provides modest muscle relaxation and alleviation of pain (see Lee Bartel article, non-patent literature).

Thus, there is a need for an effective means for relaxing and supporting healing of muscles, tendons, and joints, that does not require professional supervision and that presents no risk of injury in case of malfunction or inconsiderate use.

There is also a need for a hand-held, low-power consumption device for contactless muscle stimulation that provides a convenient and effective alternative to professional cumbersome equipment.

SUMMARY OF THE INVENTION

The present invention overcomes the deficiencies of the prior art by providing a device and a method for electroacoustic muscle stimulation, that are effective, inexpensive, and safe.

The advantages of the present invention are realized by use of some of the following ranges of acoustic stimulation band frequencies covering a range from 250 to 400 Hz.

It was experimentally found that subsequent application of two different frequencies facilitates better muscle relaxation and pain alleviation then a single frequency.

To improve an efficacy of delivering acoustic vibrations to a skin of a subject, an insulative plastic vibrating enclosure provided with a through hole for passage of the acoustic waves is used as a vibration carrier. The wall of the enclosure with the hole is further called the active wall.

The vibrating enclosure can be applied to the subject's skin in one of two ways, tangential (flat) or perpendicular (standing). In the case of parallel position, the membrane of the piezo element is positioned in parallel with the skin and a large area of the muscle is stimulated. In the case of perpendicular application, the membrane of piezo element is positioned in perpendicular with the skin, a sharp spatial gradient of vibration is formed in the area and only thin shaped area of the muscle is involved, Additionally, to maximize an afferent stimulation input to the Central Nervous System (CNS), the stimulation is to be applied not only locally to an afflicted area, but to associated areas, e.g. the symmetrical areas on the contralateral side of the body, and to similar zones according to the anterior-posterior symmetry of the body.

Besides that, maximize the effect, the stimulation is to be applied not only locally to an afflicted area and associated areas, but to general functional centers, such as Solar plexus, and its contralateral associated area on the back, Umbilicus, and its contralateral side on the back. The Solar plexus (or Celiac plexus) is a region located about 1 inch below a connection point of lower ribs on the front of the body.

According to a preferred embodiment of the present invention, a method of electroacoustic muscle stimulation is carried out by using a hand-held device having a vibrating enclosure with a single hole or multiple holes, which transmit the electroacoustic vibration stimulus by a light touch contact with the tissue.

The acoustic sound generated by the piezoelectric element vibrates the enclosure and additionally passes the acoustic air pressure through the hole to the skin; the piezoelectric element is driven by an electrical driver circuit that provides a signal with intensity sufficient to oscillate the piezoelectric element and the enclosure.

The method and the device of the invention provide an effective tool for the muscle relaxation, while substantially reducing the required power. Instead of directly moving a bulk of muscle tissues, as required when using a conventional vibrator, in the current device, the mechanical acoustic vibrations and corresponding electric fields are used as stimulants for the fast-adapting mechanoreceptors in the muscles, tendons, and joints. To make such stimulation efficient, apparatus and method according to the present invention use a lower portion of acoustic stimulation frequencies from 250 Hz to 400 Hz. These frequencies affect tactile receptors, Pacinian corpuscles—sensing acceleration and responding most to 60-400 Hz (Lee Bartel article).

The mechanoreceptors are sensitive to the dynamic components, e. g. rapid changes in touch and/or pressure. Being stimulated, they send afferent signals to the CNS, presenting a pattern of dynamic changes in touch and/or pressure. This triggers an efferent neural response of adaptation to new conditions causing reduction in the muscle and vascular tone and increase in micro-circulation. Reduction in the muscle tonus, in turn, causes a muscle relaxation and help in alleviation of pain.

Since the mechano-receptors are highly sensitive to minor mechanical displacements of the skin, the amount of energy required to stimulate them is much smaller than that the energy needed for vibrational muscle massage, because the latter comprises moving a bulk of muscle tissue.

Therefore, the electroacoustic stimulation power spent by the device and method of the present invention is substantially lower than the power used by Ultrasound equipment or the known vibration massage devices used for the same purpose.

Furthermore, since these frequencies are mostly perceivable by human hearing, they may directly affect the CNS through the hearing path, thus possibly forming a biofeedback loop, which potentially may provide an additional possibility for muscle relaxation.

According to the present invention, to achieve the muscle relaxation and/or reduction of pain, a preferred method is presented, which includes a protocol, which comprises stimulation of muscular mechano-receptors by a sequential combination of number of frequencies from the ranges recited in paragraph [0008].

It is obvious that the amplitude of the piezoelectric element oscillation should be maximized, to increase the efficiency.

Additionally, to maximize the afferent input to the CNS, the method also includes stimulation being applied not only to the afflicted area, but also to the symmetrical areas of the body, e.g. the area on the contralateral side of the body, according to the sagittal symmetry, and on the opposite side of the body, according to the anterior-posterior symmetry. In other words, when the afflicted area is on the left side of the body, the stimulation should also include a symmetrical side on the right side of the body, when the afflicted area is on the front side of the body, the stimulation should also include the symmetrical area on the back side of the body. Such approach is based on the symmetrical picture of dermatomes, e.g. segmental innervation of the skin.

Since the device is applied to the skin of the subject without substantial pressure, the problem arises how to induce a sufficient acoustic output into a tissue, when the power supply voltage is limited to a value of a portable battery level. This may be achieved in following ways.

According to a preferred embodiment, it uses the amplifier powered by a supply voltage higher than the supply voltage of oscillator, therefore the amplifier may amplify the oscillator signal to a higher voltage level sufficient for driving the piezoelectric transducer. Such higher-level supply voltage may be provided by a step-up voltage converter. As shown in FIG. 4A, the step-up voltage converter 31 provides the amplifier with high enough supply voltage, and the amplifier increases the oscillator voltage to the level needed to drive piezo transducer.

Alternative solution of achieving sufficient voltage swing for driving the piezoelectric transducer would be using the amplifier producing a low output voltage swing, which is further increased by using a step-up transformer 29, as shown in FIG. 4B. However, use of the step-up transformer brings another problem, The transformer, which is predominantly inductive element, when combined with capacitors, which are inevitably present in the device, causes a frequency dependence, which is an undesirable, since it changes a transfer function of the device, In such case, different frequencies generated by the oscillator and delivered to the piezo element, would have different amplitudes.

Wave shaping circuit is intended to form an electric signal of predetermined form, such as sinusoidal wave. However, other forms, such as triangle and square waves may also be used.

The device is controlled by microcontroller, having residing software stored in the memory; the microcontroller controls all aspects of activity of the device. The software includes Input-Output block responsible for user-device interaction, control block controlling all the device activities, including activation and control of the oscillator, selection of generated frequency, adjusting parameters of generated wave, and the time, block setting the time constrains and periodicity pattern of generated waves.

The device activity may include generation of a single continuous wave of selected frequency applied to the piezoelectric element, or periodic generation of wave trains of the same frequency separated by pauses. According to experimental results, in some cases periodic trains interrupted by pauses may be preferable with respect to continuous wave, probably since it helps to avoid habituation.

Another mode of device activity may include sequential application of different frequencies selected from the range between 250 and 400 Hz.

The selection of frequencies and the timing of all signal patterns is set by Micro-Controller.

DETAILED DESCRIPTION OF THE PREFERRED EMBODIMENT

To clarify elements of a disclosure, some definitions should be provided. Oscillator is a circuit generating one of the following periodical wave forms: sinusoidal, square, or triangle form wave, or combinations thereof.

Signal adjustment circuit is the circuit, matching or equalizing the impedances of the piezo speaker and the power amplifier output. Additionally, the circuit may produce the signal biasing from zero level by adding a DC component to the signal.

Power Source may be implemented in form of a primary or rechargeable battery or AC/DC voltage converter plugged into mains, Power Amplifier is a circuit amplifying the signal generated by the oscillator and providing a grounded or floating output signal to the piezo Speaker.

Piezo Speaker is any piezoelectric device converting the electric signal into acoustic wave, Piezo electric element is further called a piezo Speaker.

Voltage Converter is the circuit stepping up the power supply voltage to provide the amplifier with the supply voltage of sufficient value, such that the amplifier would be capable to generate an output signal sufficient for driving the piezo Speaker.

Every area found on one side of the body (front side or back side) has its own symmetrically associated area on the other side of the body (back side or front side) at the same height.

A plexus is a branching network of vessels or nerves in the body. The Solar Plexus is a bundle of nerves in the abdomen that sends and receives messages to and from the body's organs. Electroacoustic stimulation is applied to the skin projection of the plexus located between the Umbilicus and the lowest ribs in front of the body.

Figure 1A:
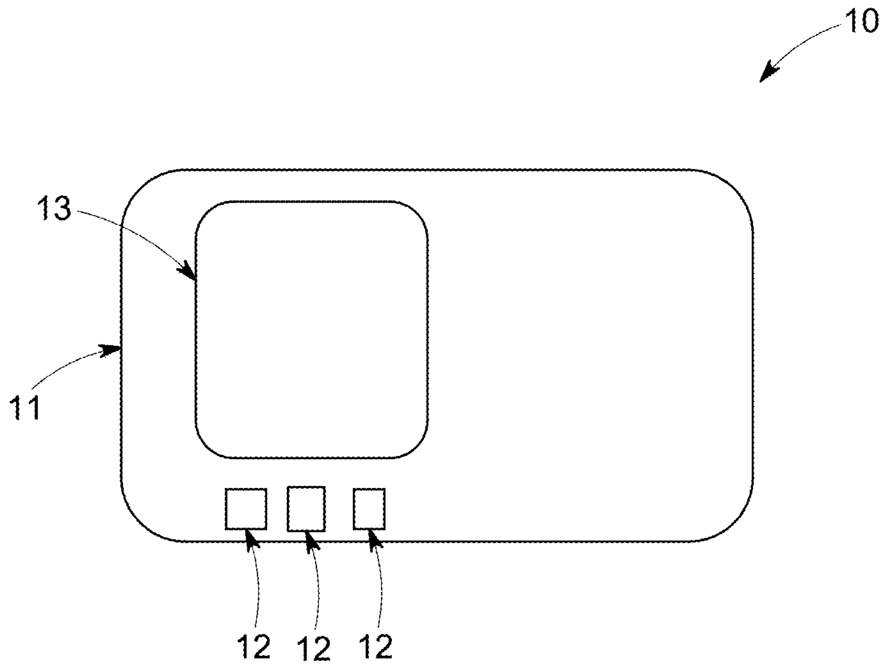
FIG. 1A is a top plan view of the electroacoustic stimulation device in accordance with present invention.
Figure 1B:
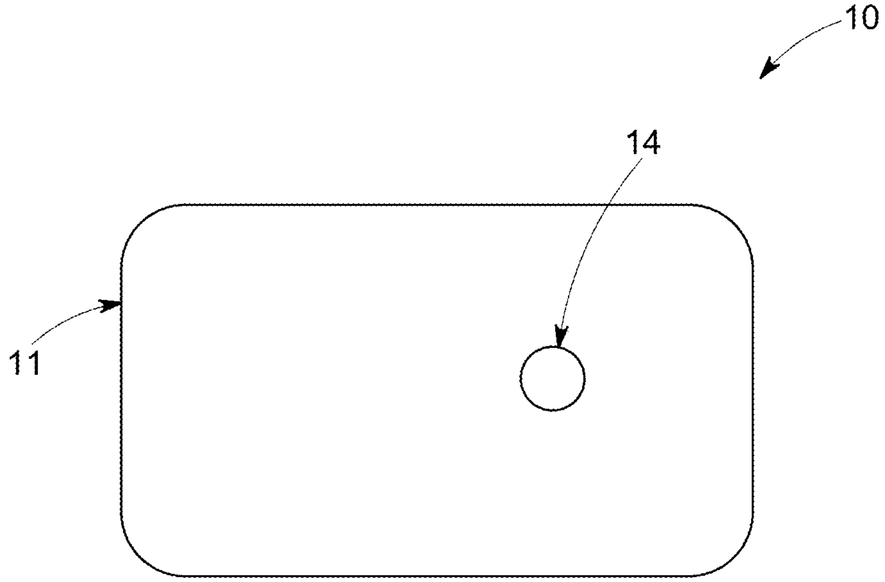
FIG. 1B is a bottom plan view of the electroacoustic stimulation device in accordance with present invention.
Figure 2:
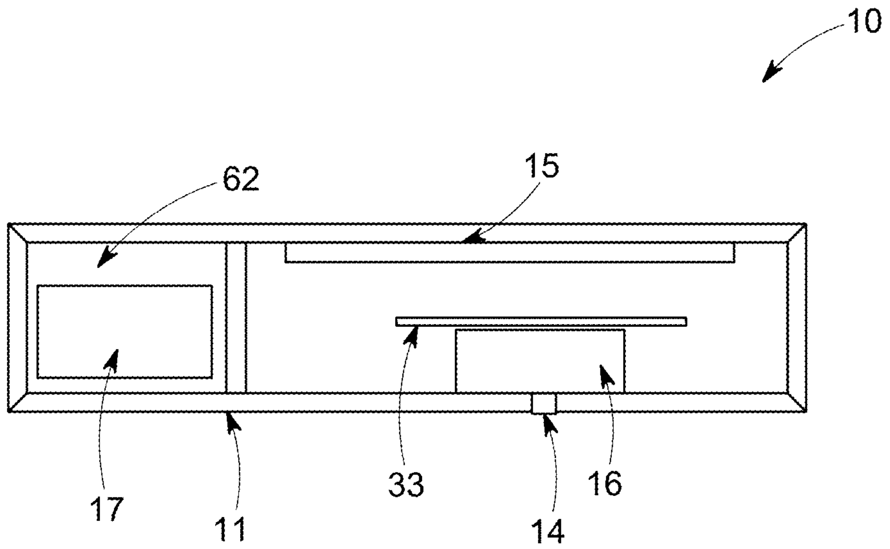
FIG. 2 is a general elevational cross-sectional view of the electroacoustic stimulation device in accordance with the present invention.

With reference now to the figures wherein like elements have the same number throughout the several views and, particularly with reference to FIG. 1A, 1B and FIG. 2, there is depicted a structure of the electroacoustic stimulation device 10 according to a preferred embodiment of the present invention.

FIG. 1A shows electroacoustic stimulation device 10 including a vibrating enclosure 11 with a faceplate incorporating Display 13 and Control Switches 12. FIG. 1B shows the bottom wall of the enclosure, including a single circular opening 14. However, multiple openings may be provided.

As shown in FIG. 2, the vibrating enclosure 11 is driven by a vibration element 16 mechanically attached to vibrating enclosure 11. Vibration element 16 is attached or mounted with glue, other adhesives or by a physical attachment such as a rivet to enclosure 11. Vibration element 16 is driven by electrical pulses and causes the enclosure 11 to oscillate. Vibrating enclosure 11 thus has the maximum freedom for oscillation, as a result of its mounting means and location. Besides that, the opening 14 in the active wall allows a free passage of audio sound to the subject's skin. The vibration element 16 may be implemented as a piezoelectric element 19.

Figure 3A:
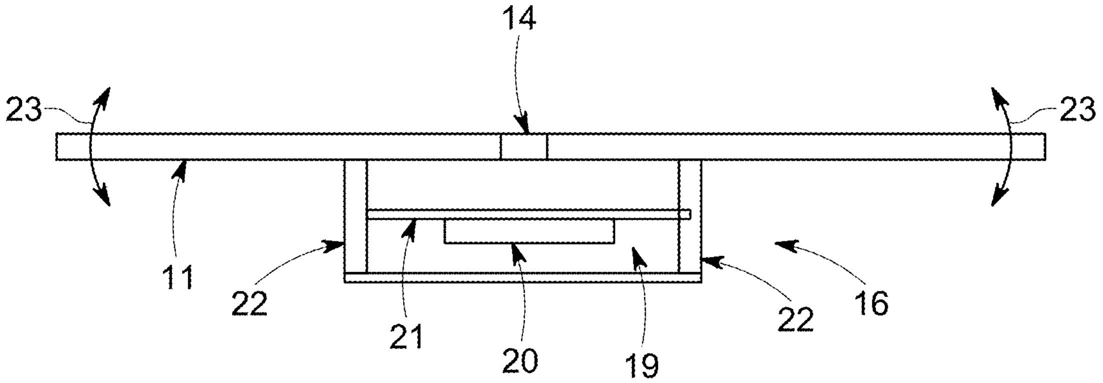
FIGS. 3A and 3B is an enlarged, elevational cross-sectional view of a vibrating enclosure attached to the bottom active wall of the device in accordance with a preferred embodiment of the present invention.
Figure 3B:
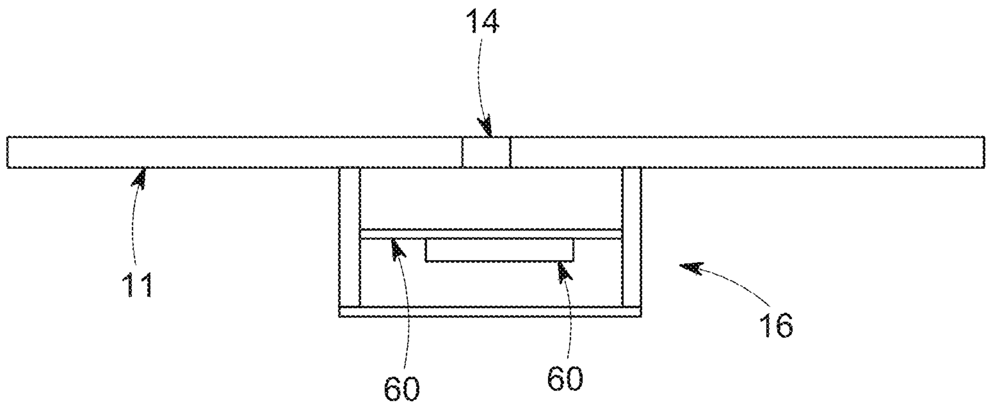

The electroacoustic stimulation device shown in FIG. 3A and 3B, comprises the vibration enclosure 11, a piezoelectric element 19, or bender, comprising a piezo-ceramic disk 20 attached by an adhesive to a larger diameter metal disk 21. Disk 21 is circumferentially encapsulated into a plastic circular edge ring 22 which, in turn, is attached to vibrating enclosure 11 by an attachment means such as an adhesive or a physical member such as a rivet.

Both piezo-ceramic disk 20 and metal disk 21 are electrically connected to an electronic control circuit board 15 by electrical wires 60, one of which is electrically attached to ceramic disk 20 and another to metal disk 21, such as by being soldered thereon.

In order to affect the human body, the known vibrating devices should be hard pressed to the body surface, However, it was experimentally found that the instant electroacoustic stimulation device provides a sufficient effect, even when being located at some distance from the body. An explanation for this effect is that in addition to mechanical acoustic waves, the piezoelectric element produces not only internal electric field bending the membrane and producing the sound, but additionally producing a fringe electric field, that reaches the body of the subject causing some neurologic effects.

As presented by some patents issued in the past, for example U.S. Pat. No. 5,782,874, when two conductive plates separated by a dielectric and carrying different potential brought into vicinity of the subject body, the external or fringe field of the plates produces some neurologic effects in a peripheral neural system of the subject.

According to U.S. Pat. No. 5,782,874, the currents induced into the subject's body are too small to cause classical nerve stimulation, however a central nervous system response is evoked. Since classical nerve stimulation cannot occur, these signals apparently produce a stochastic modulation of spontaneous firing patterns.

To enhance the device effect the instant invention includes an additional structural element intended to enhance the fringe electric field generated by piezoelectric element. There is an additional conductive plate 33 located in vicinity of piezoelectric element and in parallel with the plates of the piezoelectric element; the plate is either directly or via capacitors coupled with a ground wiring of the electrical circuit of the driver or with one of the plates of the piezoelectric element. Additional electric field lines are formed between the metal plate of the piezoelectric driver and the conductive plate thus enhancing the external or fringe field of the device.

Electronic control circuit board 15 is powered by an electrical battery 17 located in a battery compartment 62 of the enclosure 11, as shown on FIG. 2. The battery may be a primary (non-rechargeable) or rechargeable battery.

Figure 3C:
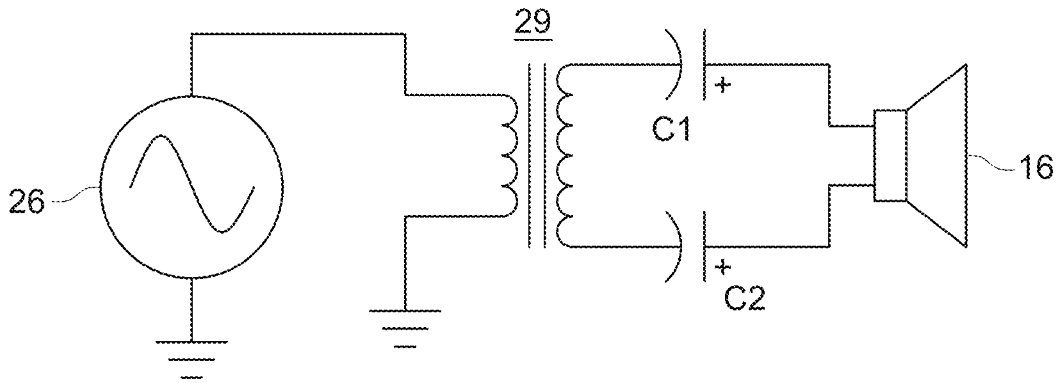
FIG. 3C is a diagram showing a voltage enhancement circuit and signal adjustment circuits coupled to the Piezo Speaker.

When electrical pulses are applied to the piezoelectric element, they cause oscillations of vibrating enclosure 11 in the directions as shown by double-headed arrows 23 on FIG. 3A. FIG. 3C shows both a voltage enhancement circuit 29 implemented as a transformer and signal adjustment circuits 28 implemented as a pair of capacitors. The transformer is used to increase an amplitude of the signal to the value sufficient for driving the Piezo Speaker 16. A pair of capacitors is used to adjust the inductive impedance of the transformer and to match it with capacitive impedance of the Piezo Speaker. As a result, the Piezo Speaker is floating. e.g. it is not bound to any reference voltage of the circuit. It helps to form the electric field of the Piezo Speaker and its projection onto the skin not biased and having centrally symmetrical shape.

Figure 4:
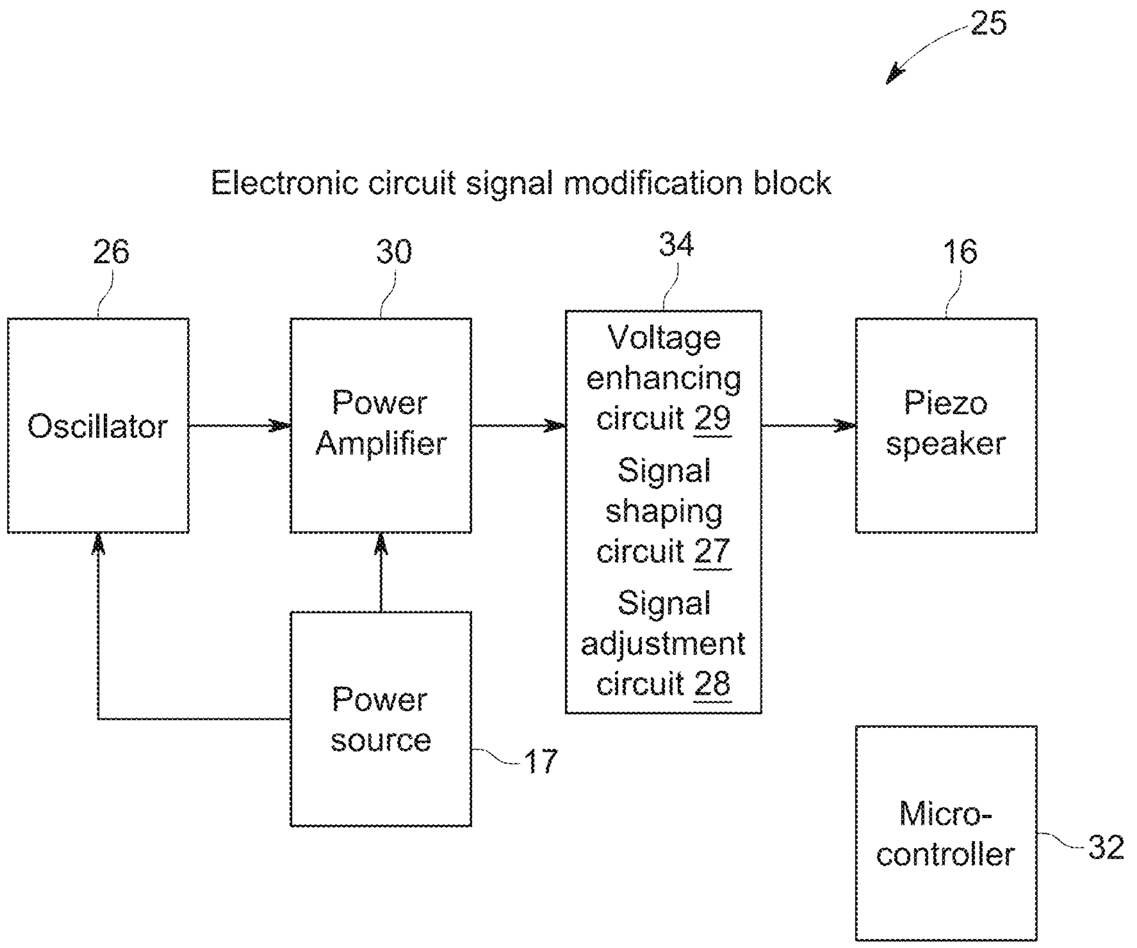
FIG. 4 is a block diagram of an electrical circuit that drives the Piezo Speaker element according to the embodiment of the present invention.

A block-diagram of an electronic circuit 25, which is driving the vibration enclosure 11, is shown in FIG. 4. Electronic circuit 25 is comprised of an electronic driver including an electronic oscillator 26, which outputs being connected to inputs of an amplifier 30, which outputs in turn being coupled to a signal modification block 34, which may include the voltage enhancement circuit 29, the signal shaping circuit 27, and the signal adjustment circuit 28, the signal modification block delivers its output signals to the piezo-electric Speaker 16.

The electronic oscillator 26 generates a sinusoidal wave with a predetermined frequency selected from the range between 250 Hz and 400 Hz, Alternatively, it may generate triangle or square shape or triangle shape waves with the same frequencies, as mentioned above. When the oscillator circuit of the driving circuit generates either triangle or square form wave, the signal shaping circuit 27 may convert them into sinusoidal waves.

When oscillator generates sinusoidal signal, the signal shaping circuit 27 may be omitted.

Figure 4A:
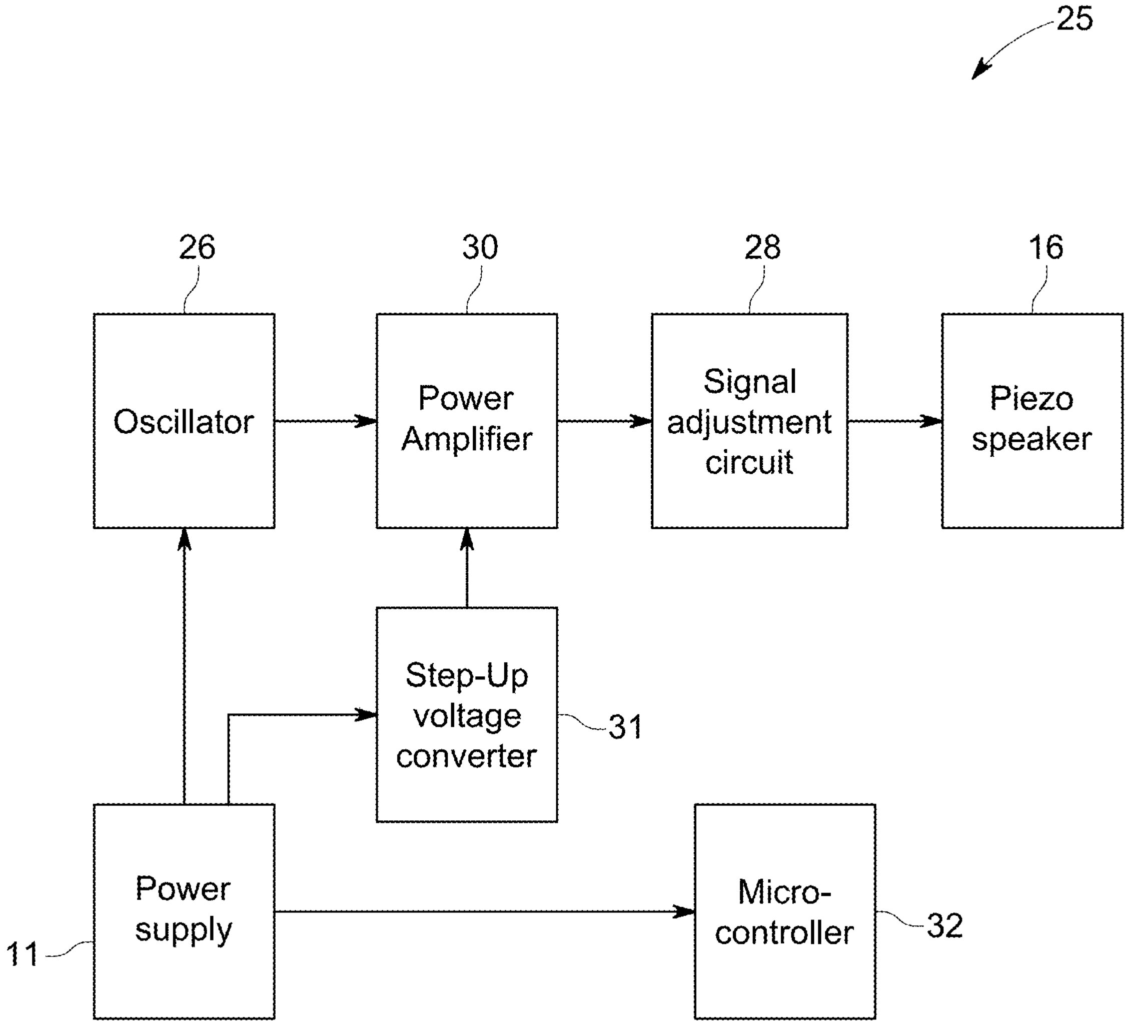
FIG. 4A is a schematic block diagram of an Electronic Circuit powered by a step-up voltage converter and driving the Piezo Speaker element.

FIG. 4A shows the preferred embodiment of the instant invention, including the step-up voltage converter 32 increasing the power supply voltage and delivering such voltage as a supply to the amplifier 30. It allows the amplifier to amplify the oscillator 26 output signal to a high value sufficient for driving the piezo Speaker 16.

The device structure shown FIG. 4A includes the voltage converter 32, the oscillator 26 generating the sinusoidal wave with a predetermined frequency selected from the range recited in paragraph [0008], the amplifier 30 increasing the sinusoidal signal of the oscillator to a predetermined level, the signal adjustment circuit 28, which 1) matches the resistive output impedance of the amplifier 30 with the capacitive impedance of the piezo Speaker 16, 2) provides a voltage bias for sinusoidal signal of the amplifier, and delivers the adjusted signal to the Piezo Speaker 16. The signal adjustment of the device plays an important role in strengthening the acoustic output, as will be further elaborated ([0071]-[0073]).

Figure 5:
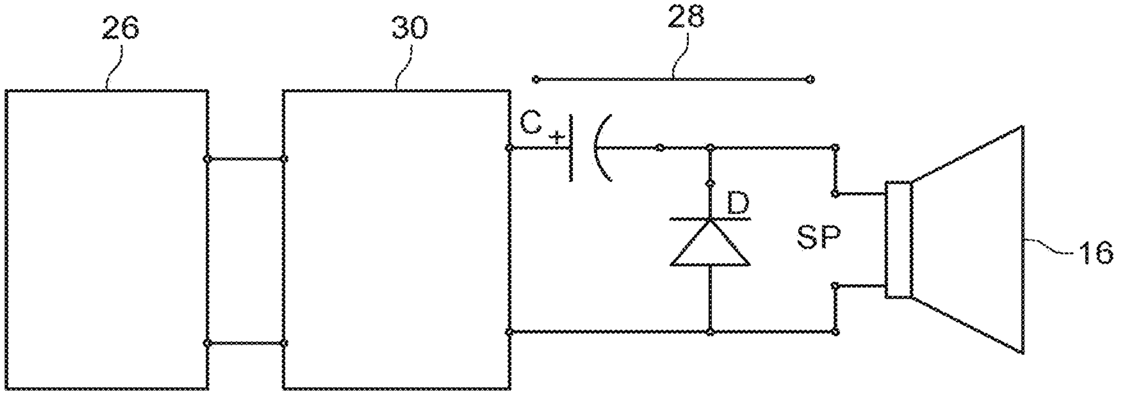
FIG. 5 is an electrical schematic diagram of the signal adjustment circuit producing a biasing of the signal.

FIG. 5 shows the circuit diagram of the signal adjustment circuit 28. The circuit includes the capacitor C and diode D combination which receives the sinusoidal output signal from the power amplifier 30 and forms the biased signal in which the sinusoidal wave is being biased with respect to zero level. The biased signal delivered to the piezo Speaker is the sinusoidal wave running on the top of zero voltage level.

Figure 4B:
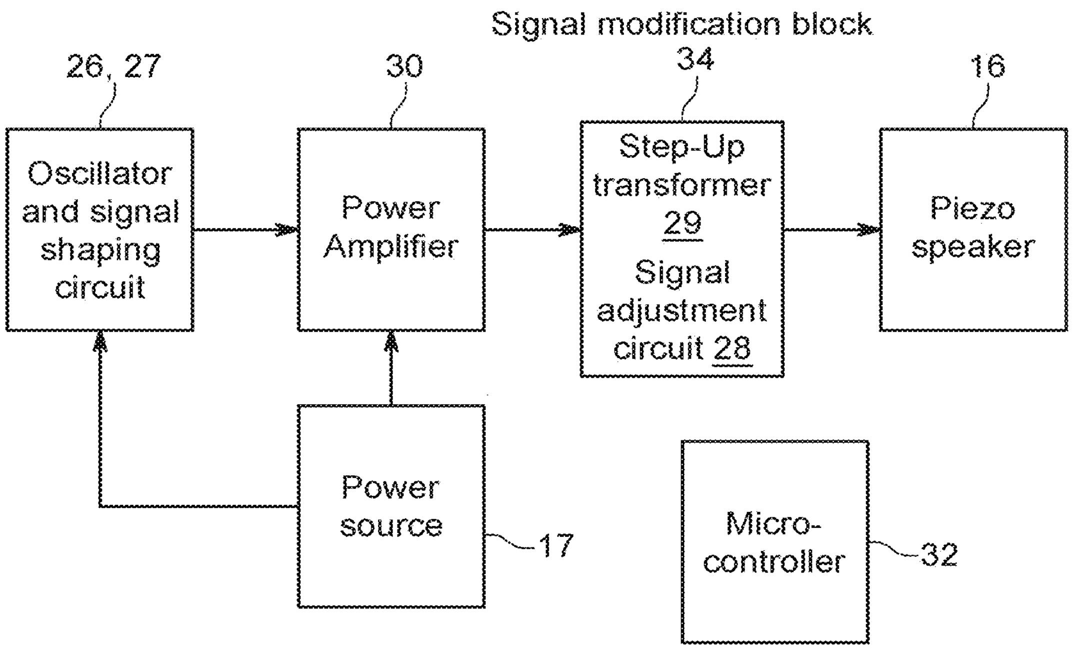
FIG. 4B is a schematic block diagram of an Electronic Circuit driving the Piezo Speaker element and using step-up transformer as a voltage enhancement circuit.

Another modification of the electronic circuit 25 is shown in FIG. 4B. In this embodiment the step-up voltage converter is omitted, the power amplifier 30 has relatively low power supply voltage, and eventually produces low output voltage, which is not sufficient for driving the piezo Speaker 16. To resolve this problem, the signal enhancement circuit in form of step-up signal transformer 29 is used. The transformer increases the signal voltage several times, such that the resulting voltage is sufficient to drive the piezo Speaker 16.

Figure 5A:
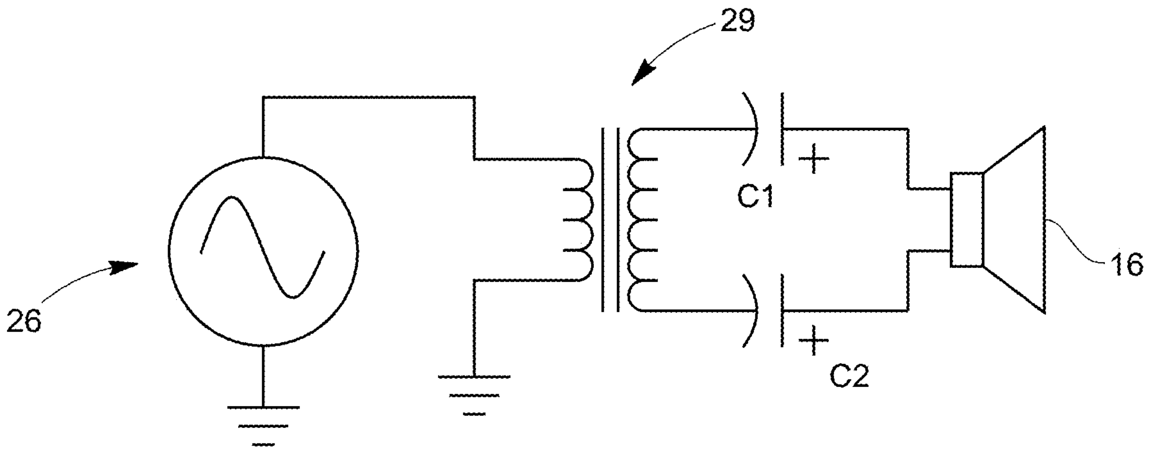
FIG. 5A is an electrical schematic diagram of the signal adjustment circuit implementing impedance matching between the enhancement circuit and piezo Speaker.

The step-up signal transformer 29 (see FIG. 4B and 5A) is installed between the output of the amplifier 30 and the signal adjustment circuit 28 to elevate the signal to a level sufficient for driving the piezoelectric Speaker 16. The transformer schematically belongs to both, the signal shaping circuit 27 and to the signal adjustment circuit 28; its secondary winding together with capacitors C1 and C2 (FIG, 5A) form the signal adjustment circuit, particularly by matching a capacitive impedance of the piezo Speaker 16 with the amplifier 30 output impedance. Each of the capacitors Interconnects one of the terminals of the secondary winding L2 with of the input terminals of the piezoelectric element. The capacitors have capacitance in the range of 0.1 uF to 10 uF.

Figure 6:
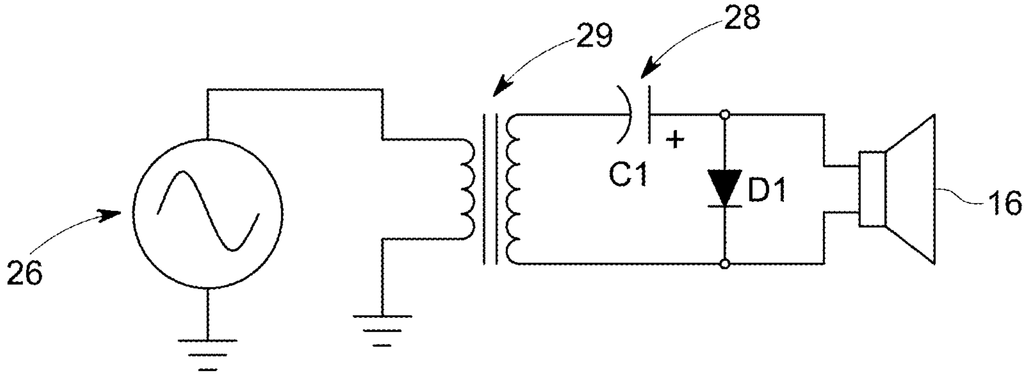
FIG. 6 is an electrical schematic diagram of another version of the signal adjustment circuit producing a biased signal.
Figure 7:
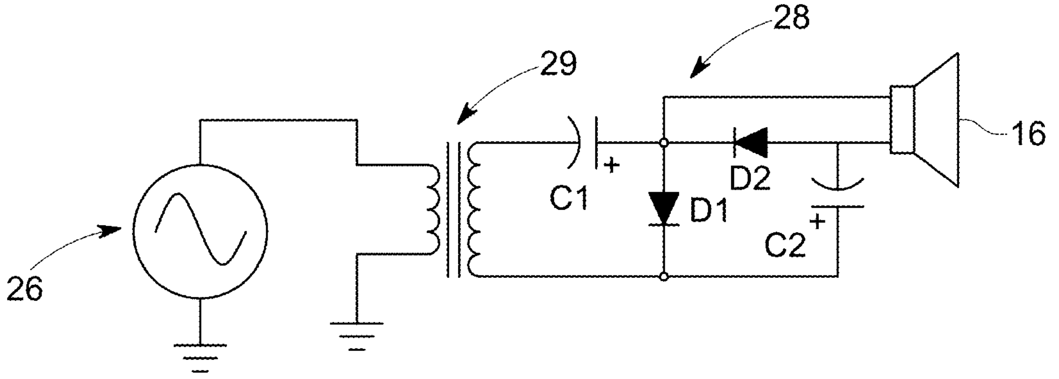
FIG. 7 is an electrical schematic diagram of upgraded signal adjustment and biasing circuit.

FIGS. 6 and 7 show different but similar implementations of the signal adjustment circuit. In FIG. 6 one of the outputs of enhancing circuit or transformer 29, which is the enhancement element, is coupled via series connected capacitor C to one of terminals of diode D, which has its second terminal being coupled directly to another output of transformer 29, while the piezo Speaker 16 is connected across terminals of diode, such that the anode of the diode is connected to the metal plate of the piezo Speaker and the cathode is connected to the ceramic plate of the piezo Speaker. As a result, the piezo Speaker receives the sinusoidal wave biased with respect to zero level, and the meta plate of the piezo Speaker is biased negatively with respect to the ceramic plate.

The adjustment circuit of FIG. 6 may be upgraded as demonstrated in FIG. 7, wherein the output voltage from a secondary winding of the transformer is delivered to the piezo Speaker via combination of capacitors and diodes forming a voltage multiplier including two cascaded two-port circuits. Each two-port circuit includes a series connected capacitor-diode circuit. A first two-port circuit includes a series connected capacitor-diode circuit (C1, D1) and a second two-port circuit includes a series connected capacitor-diode circuit (C2, D2). Each two-port circuit receives an input signal between two external terminals of series connected capacitor-diode circuit, e.g. the first two port circuit receives the input signal between the left terminal of capacitor C1 and the bottom terminal of diode D1, which are external terminals of C1, D1 two-port circuit. The first two-port circuit provides an output signal between an upper and bottom terminals of diode D1. The first two-port circuit receives the input signal from the output of the signal enhancement circuit, e.g. from the secondary winding of transformer 29. The second two-terminal circuit includes diode D2 and capacitor C2. The input of the second two-terminal circuit is also between external terminals of its capacitor-diode circuit, e.g. the left terminal of diode D2 and bottom terminal of capacitor C2. The input of the second two-terminal circuit is coupled to the output of the first two-terminal circuit, e.g. the left terminal of diode D2 is coupled to the upper terminal of diode D1 and the bottom terminal of capacitor C2 is coupled to the bottom terminal of diode D1. And the piezoelectric element (16) is directly coupled to the output of the second two-port circuit ". e.g. between terminals of diode D2.

As well known in the art, the voltage across capacitor C2 is twice higher than the amplitude of the signal at the output of the transformer. The voltage drop across diode D2, is an AC signal biased with respect to zero level, is being applied to the piezo Speaker 16. The polarity of bias is the same as in FIG. 6 version.

To achieve a sufficient acoustic output with limited power source voltage and limited values of maximum allowable amplifier supply voltages, the instant invention employs another solution presented herein. According to the preferred embodiment, the device employs a couple of piezo elements arranged in a stack arrangement, as shown in FIG. 9C. Here the ceramic disk (white block) of one piezo element #1 faces the metal disk (the black element) of another piezo element #2. Both elements receive driving signals from the same source, which means that both driving waves have the same frequency and the same phase. The piezo elements receive biased driving signals of different polarity. It is implemented by connecting the first piezoelectric element such that a negative pole is coupled to the metal plate of the piezoelectric element and positive pole of biasing voltage to the ceramic disk, and the second piezoelectric element such that a positive pole coupled to the metal plate of the piezoelectric element and the negative pole to the ceramic disk.

Figure 9A:
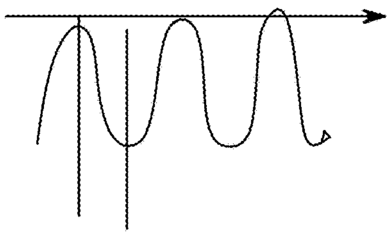
FIG. 9A and 9B, biased signals waveforms applied to #1 and #2 piezoelectric elements of the stack.
Figure 9B:
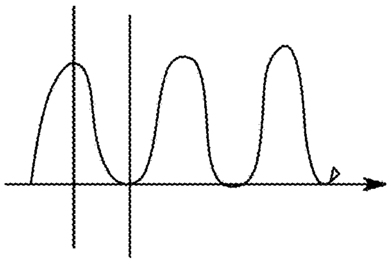
Figure 9C:
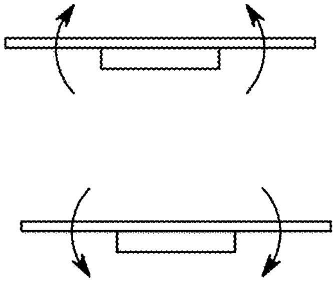
FIG. 9C is a piezoelectric stack structure and its push-pull functioning.

The results of such bias are shown in FIG. 9A and 9B, where the driving signals of piezoelectric elements have the voltage bias of different polarity, #2 is biased in a positive direction from zero level (FIG. 9B), while #1 is biased in a negative direction from zero level (FIG. 9A).

As shown in FIG. 9A and 9B, when the first element has maximum value, another one is at zero level, and when the first element is at zero level, another one is at maximum. Because of the biases, the sinusoidal waves have a maximum value of about 2 Am, where Am is an original amplitude, or maximum value of non-biased sinusoidal signal (as clear shown in FIG. 9A, 9B). Since both waves are biased with respect to zero level, each of them at a moment of maximum has a double amplitude value. In action this couple of piezo elements works in tandem like a push-pull element providing a double acoustic pressure in both directions. When the driving signal of the first element #1 has its maximum value, the driving signal of the second element #2 has zero value and vice versa. Therefore, at time t0 the metal disk of #1 delivers a push of membrane downward with 2 Am strength, and at the time t1 the #2 metal disk delivers a push of membrane upward (due change of polarity) with 2 Am strength, as shown by arrows. Accordingly, the acoustic wave with sinusoidal pushes of double strength being produced.

Device Control

The device is controlled by microcontroller 32, having residing software stored in the memory; the microcontroller controls all aspects of activity of the device. The software includes Input-Output block responsible for user-device interaction, control block controlling all the device activities, including activation and control of the oscillator, selection of generated frequency, adjusting parameters of generated wave, and time block setting the time constrains and periodicity pattern of generated waves.

Figure 8A:
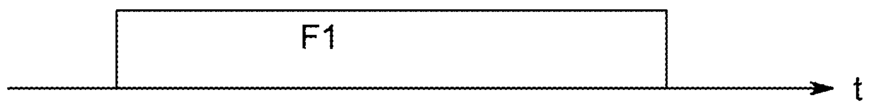
FIG. 8A is a timing diagram of continuous application of the acoustic wave.
Figure 8B:
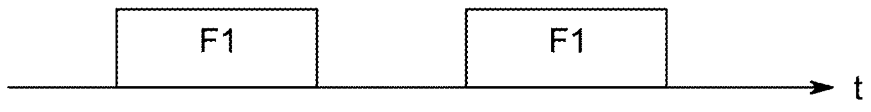
FIG. 8B is a timing diagram of periodic application of the wave trains of a same frequency.
Figure 8C:
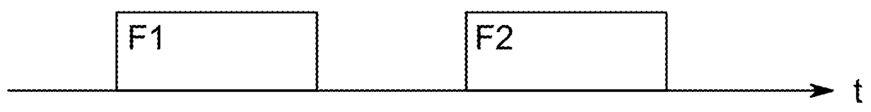
FIG. 8C is a timing diagram of periodic application of the wave trains of different frequencies.

In order to prevent habituation, the temporal pattern of the sound frequency may be periodically changed. This can be done either by replacing a continuous wave of the same frequency shown in FIG. 8A by either periodic generation of wave trains of the same frequency separated by pauses, as shown in FIG. 8B, or by sequential application of different frequencies selected from different groups of ranges, as shown in FIG. 8C.

According to experiments results, in some cases periodic train with pauses may be preferable with respect to continuous wave, apparently, since such waveforms help to avoid habituation.

Another mode of device activity may include sequential application of different frequencies selected from the range between 250 and 400 Hz. Such mode of activity with alternating frequencies is illustrated in FIG. 8C.

Setting a mode of activity, selection of frequencies and the timing of all signal patterns being set by Micro-Controller 32.

Today there are some types of massage, such as reflexology or acupressure that apply massage not only to the afflicted area, but also to some remote areas having some specific functional features. Our experience with electroacoustic stimulation shows that using such areas for stimulation increases efficacy of treatment. Therefore, our protocols employ similar strategies.

Accordingly, the stimulation is being applied not only locally to an afflicted area, but also to associated areas, e.g. the symmetrical areas on the contralateral side of the body, and/or to similar zones according to the anterior-posterior symmetry of the body. Such strategy is based on symmetricity and looplike shapes of human dermatomes.

Besides that, to maximize the efficacy, the stimulation is also may be applied to the following cutaneous areas representing general functional centers: Solar (Celiac) plexus, and its associated area on the back (at the same level), and Umbilicus (Navel), and its associated area on the back (at the same level).

The Solar plexus is a complex system of radiating nerves and ganglia playing an important role in the functioning of the stomach, kidneys, liver, and adrenal glands.

The Umbilicus (Navel) sometime may be perceived, as a rudimentary organ. However, at the time of embryo development the whole body of embryo is supplied with nutrients via umbilical cord. And after delivery, when the cord is severed, the umbilicus retains its connections to a huge plexus of blood vessels, capillaries, and veins. It has been suggested that even in a post-embryonic period the Umbilicus plexus retains its control over many physiological structures and organs.

Of course, the stimulation is not applied directly to the plexuses, since they are inside the body, but to theft projection on the skin.

Location of Solar plexus projections: On the front—it is in an upper area of the stomach between the lower ribs. On the back—it is on the spinal cord at the level between 9th and 10th thoracic vertebras.

As to Umbilicus (Navel), its front area is circular centered in the umbilicus itself, the Back projection is a similar area on the spinal cord at the level under the 4th thoracic vertebra.

Figure 10:
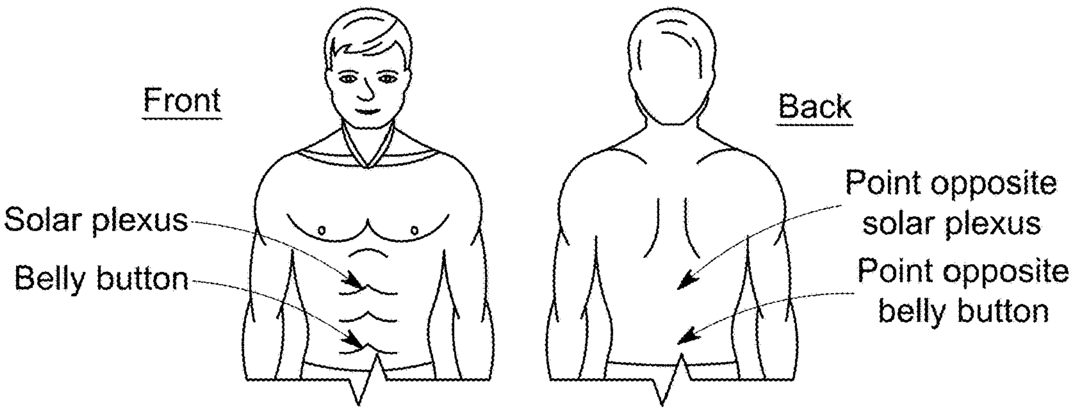
FIG. 10 shows mapping of Four Major points.

We define these four points recited in [0085]-[0089] as a Four Major Points, which are shown in FIG. 10.

It is recommended that stimulation of each of major points would last for about 30 seconds, using the same frequency, with total duration of 2 minutes. Alternatively, different frequencies may be used for stimulation of different points or for stimulation of the same point, as described for example in [0080].

The device may be effectively used for a muscle relaxation including muscle spasms or cramps caused by strained muscles. Most muscle cramps develop in the leg muscles, particularly in the calf. It was experimentally found that to achieve fast alleviation of muscle strain, the device should be applied not to a painful spot but to a contralateral spot. As well known, there are two forms of leg muscle spasms: a spasm that causes a limb to bend and causing the leg to move upwards towards the body, which is called a flexor spasm, and a spasm that causes a limb to extend and causing the leg to straighten away from the body, which is called an extensor spasm. In other words, there are two opposite muscles used for opposite movements and when one of them is overstrained and another one fails to resist, the result is the muscle cramp, Therefore, when the cramp occurs, not the painful spot but the strained muscle on an opposite side of the limb, should be treated for relaxation and cessation of the cramp.

The invention claimed is:

1. An electroacoustic stimulation device comprising:

a vibrating enclosure, a piezoelectric element, an electronic driver circuit, and a signal adjustment circuit, a conductive plate located in the vicinity of and in parallel with a metal plate of the piezoelectric element; the conductive plate is capacitively coupled with the metal plate of the piezoelectric element, and the piezoelectric element is electrically connected to the electronic driver circuit via the signal adjustment circuit, the piezoelectric element is driven by the electronic driver circuit and oscillates at predetermined frequency selected from an acoustic frequency range, and the piezoelectric element generates an acoustic wave and an external, fringe electric field wherein the acoustic wave and the fringe electric field are configured to be applied to preselected spots on a skin tissue of a patient via the vibrating enclosure and an acoustic hole, wherein the signal adjustment circuit consists of a voltage multiplier consisting of a plurality of cascaded two-port circuits, wherein each two-port circuit consists of a series connected capacitor-diode circuit, each two-port circuit receives an input signal between two external terminals of the series connected capacitor-diode circuit and provides an output signal across its diode terminals, a first two-port circuit receives the input signal from an output of the signal enhancement circuit, an input of a second two-port circuit is coupled to an output of the first two-port circuit, and the piezoelectric element is directly coupled to an output of the second two-port circuit.

2. The electroacoustic stimulation device, as claimed in claim 1, wherein said frequency range comprises frequencies between 250 and 400 Hz, wherein the frequency of oscillation periodically changes with a time according to a sinusoidal form.

3. The electroacoustic stimulation device, as claimed in claim 1, wherein selection of predetermined signal frequencies, control of predetermined signal frequencies durations, and timing of signals onset and cessation are implemented by a microcontroller.

4. The electroacoustic stimulation device, as claimed in claim 1, wherein said piezoelectric element oscillates with a frequency, which periodically changes with a time according to a sinusoidal form.

5. The electroacoustic stimulation device according to claim 1, wherein said the electroacoustic stimulation device generates acoustic signals in form of packets of the same frequency, and wherein the packets are separated by audio pauses.

6. The electroacoustic stimulation device according to claim 1, wherein the electroacoustic stimulation device generates acoustic signals in form of packets of different frequencies, and wherein said packets of different frequencies are separated by audio pauses.

7. The electroacoustic stimulation device according to claim 1 comprising a plurality of switches located on a top of the vibrating enclosure which when activated control a microcontroller, which is provided with a software for performing the following functions:

setting a predetermined acoustic frequency, activation of the device, generation of an output signal with predetermined acoustic frequency, counting a predetermined time of the signal generation, stopping generation of an output signal, holding the device in a pause, restarting generation of the signal with the same or different frequency, and generation of a visual and/or acoustic indication of the device status.

8. Electroacoustic stimulation device comprising:

a vibrating enclosure, a piezoelectric element, an electronic driver circuit, and a signal adjustment circuit, and the piezoelectric element is electrically connected to the electronic driver circuit via the signal adjustment circuit, the piezoelectric element is driven by the electronic driver circuit and oscillates at predetermined frequency selected from an acoustic frequency range, and the piezoelectric element generates an acoustic wave and an external fringe electric field configured to be applied to predetermined spots on a skin tissue of a patient via the vibrating enclosure and an acoustic hole, wherein the signal adjustment circuit is a voltage multiplier consisting of several cascaded two-port circuits, wherein each two-port circuit consists of a series connected capacitor-diode circuit, wherein an input signal is applied between two external terminals of the capacitor-diode circuit, and an output signal is produced across its diode terminals, the first two-port circuit receives an input signal from an output of the signal shaping circuit, an input of the second two-terminal circuit is coupled to an output of the first two-terminal circuit, and the piezoelectric element is directly coupled to an output of a second two-port circuit.

9. The electroacoustic stimulation device according to claim 8, wherein the predetermined spots on the skin tissue of the patient intended for treatment of muscle spasm or pain in limbs and comprise:

a group of spots including: (i) an afflicted area, and (ii) a group of spots on the side of the limb opposite the afflicted area according to a medial-lateral symmetry.

10. The electroacoustic stimulation device according to claim 8, wherein the predetermined spots on the skin tissue of the patient comprise:

a group of spots including: (i) an afflicted area, and (ii) general functional centers of the body.

11. The electroacoustic stimulation device according to claim 10, wherein said general functional centers of the body include the Solar Plexus, and its contralateral spot on the back, the Umbilicus, and its contralateral spot on the back.

12. The electroacoustic stimulation device, as claimed in claim 8, wherein said piezoelectric element oscillates with a frequency, which periodically changes with a time according to a sinusoidal form.

13. The electroacoustic stimulation device, as claimed in claim 8, wherein said acoustic frequency range comprises frequencies between 250 and 400 Hz, and wherein the oscillating frequency periodically changes with a time according to sinusoidal form.

14. The electroacoustic stimulation device, as claimed in claim 8, wherein the conductive place and a metal plate of the piezoelectric element are capacitively coupled by a capacitor part.

15. The electroacoustic stimulation device according to claim 8, wherein the predetermined spots on the skin tissue of the patient are intended for treatment of muscle spasm or pain in chest and comprise a combination of the following spots: (i) an afflicted area of the chest, and (ii) a spot on a contralateral with respect to the afflicted area side of the chest, according to the sagittal symmetry, and (iii) a spot on the opposite side of the body, according to the anterior-posterior symmetry.

* * * * *